United States Patent [19]

Kikuchi et al.

[11] Patent Number: 5,762,362

[45] Date of Patent: Jun. 9, 1998

[54] AUTOMOTIVE AIR BAG COVER AND METHOD OF MOLDING SAME

[75] Inventors: Hirohiko Kikuchi; Kazuhiro Saito, both of Omiya, Japan

[73] Assignee: Kansei Corporation, Omiya, Japan

[21] Appl. No.: 636,980

[22] Filed: Apr. 24, 1996

[30] Foreign Application Priority Data

Apr. 24, 1995 [JP] Japan .................. 7-098655

[51] Int. Cl.$^6$ .................................... B60R 21/16
[52] U.S. Cl. ............................ 280/728.3; 280/732
[58] Field of Search ................. 280/728.3, 731, 280/732

[56] References Cited

U.S. PATENT DOCUMENTS

| | | | |
|---|---|---|---|
| 5,069,477 | 12/1991 | Shiraki | 280/728.3 |
| 5,183,289 | 2/1993 | Zeller et al. | 280/728.3 |
| 5,376,461 | 12/1994 | Shiraki et al. | 428/35.2 |
| 5,458,361 | 10/1995 | Gajewski | 280/728.3 |

FOREIGN PATENT DOCUMENTS

| | | | |
|---|---|---|---|
| 583079 | 2/1994 | European Pat. Off. | 280/728.3 |
| 4-328057 | 11/1992 | Japan | 280/728.3 |
| 5-286399 | 2/1993 | Japan . | |
| 5-278547 | 10/1993 | Japan | 280/728.3 |
| 2270284 | 3/1994 | United Kingdom | 280/728.3 |
| 2270884 | 3/1994 | United Kingdom | 280/728.3 |

*Primary Examiner*—Paul N. Dickson
*Attorney, Agent, or Firm*—Jacobson, Price, Holman & Stern, PLLC

[57] ABSTRACT

An air bag cover (21) is provided which covers an air bag device and consists of a core layer (23) made of hard resin and a skin layer (22) made of soft resin. The air bag cover (21) has a lid (21a) cracked and opened by actuation of the air bag device. The lid (21a) has cracked-open portions (26) along which the lid (21a) is cracked by pressure generated when the air bag is inflated and a hinge portion (24) on which the lid (21a) is opened and by which the lid (21a) is held. The hinge portion (24) has hinge holes (22a) through which the soft resin of skin layer (22) flows onto the back surface of the core layer (23). A method of molding the air bag cover (21) takes first and second stages. In the first step, after a pair of molds are clamped, molten hard resin for a core layer (23) is injected into a cavity of one of the molds. The hard resin is cooled and hardened to form the core layer (23). In the second step, after the molds are opened, a core die component (35c) of the mold used in the first step is moved and brought into contact with a cavity die component (35b) of the other mold. Thereafter, molten soft resin for a skin layer (22) is injected into a space between the core layer (23) formed on the core die component (35c) and the cavity die component (35b) in order to form the skin layer (22).

8 Claims, 6 Drawing Sheets

FIRST PROCESS   SECOND PROCESS

AUTOMOTIVE AIR BAG COVER AND METHOD OF MOLDING SAME

BACKGROUND OF THE INVENTION

1. Field of the Invention

This invention relates to an automotive air bag cover with which covered is an air bag device mounted in a motor vehicle for ensuring the safety of the driver and passengers. It also relates to a method of molding the automotive air bag cover.

2. Description of the Prior Art

Figure 7:
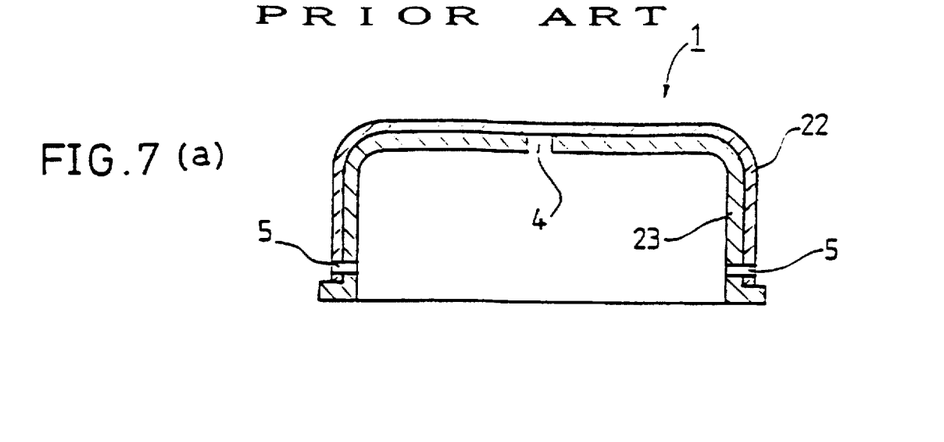
FIG. 7(a) is a sectional view of a conventional automotive air bag cover, taken on line I—I of FIG. 7(b)
FIG. 7(b) is a plan view of the conventional automotive air bag cover.

As shown in FIGS. 7(a) and 7(b), an automotive air bag cover is known which is described in Japanese Patent Application Laid-Open Publication No. Hei 1-202550.

In FIGS. 7(a) and 7(b), reference number 1 designates an air bag cover, reference numeral 4 designates a slit, and reference numeral 5 designates a through-hole. The air bag cover 1 consists of a core layer 23 formed by injecting hard resin into a mold and a skin layer 22 formed integrally with the core layer 23 by pouring soft resin on the outer surface of the core layer 23.

In the core layer 23 of the air bag cover 1, the slit 4 along which the air bag cover 1 is cracked when an air bag is inflated is formed substantially H-shaped. In the vicinity of the lower part (in FIG. 7(a)) of the air bag cover 1, a plurality of holes 5 are bored through the core and soft layers 23, 22. The air bag cover 1 is fastened to the upper part of the air bag device by means of bolts, rivets, or the like passing through the hole 5.

This conventional air bag cover 1 is molded in the following way. Hard resin for a core layer is melted and injected into a space between a core (male die) of a mold which has a substantially H-shaped convex and a first cavity (female die) of the mold in order to form the core layer 23 having the slit 4.

After that, soft resin for a skin layer is melted and injected into a space between the core (male die) on which the molded core layer 23 is kept and a second cavity (female die) of the mold. As a result, the air bag cover 1 is formed in which the core and skin layers 23, 22 are integral with each other.

In the air bag cover 1 covering an air bag device (not shown), when an air bag is inflated by the actuation of an inflator contained in the air bag device, the slit 4 is broken along the line of its H-shape by the pressure of the inflated air bag and thereby the air bag cover 1 is opened on hinge portions (H) which are indicated by the alternate long and short dash lines in FIG. 7(b).

However, in this conventional air bag cover 1, since the skin and core layers 22, 23 are partly fused together with a composition plane between, cases occur in which the skin and core layers 22, 23 are separated from each other and the core layer 23 is broken into pieces and scatters in all directions when the slit 4 is broken. In addition, disadvantageously, adequate consideration is not given to the hinges (H) so that the hinges (H) can properly perform their own functions. In other words, when the slit 4 is broken and thereby the air bag cover 1 is opened, the parts (H) indicated by the alternate long and short dash lines in FIG. 7(b) do not always perform a proper function as a hinge and therefore an unexpected part of the air bag cover 1 might be cracked open. As a result of the air bag cover 1 being irregularly cracked open, the air bag cannot be normally or fully inflated.

SUMMARY OF THE INVENTION

It is therefore an object of the present invention to provide an automotive air bag cover which is formed integrally with an instrument panel and has a groove along which the cover is cracked and a hinge on which the cover is correctly opened without scattering.

A feature of the present invention is that an automotive air bag cover covering an air bag device consists of a core layer made of hard resin and a skin layer made of soft resin and has a lid cracked and opened by actuation of the air bag device. The lid had cracked-open portions along which the lid is cracked by pressure generated when the air bag is inflated and a hinge portion on which the lid is opened and by which the lid is held.

Another feature of the present invention is that the cracked-open portions each have a split groove formed in the core layer, and the hinge portion has hinge grooves and hinge holes along a hinge line. The hinge grooves and the hinge holes are alternately arranged along the hinge line. The hinge portion has a plugging portion of the skin layer which extends to a periphery of the hinge hole on a back surface of the core layer.

Still another feature of the present invention is that the core layer forming a back of the air bag cover has a rib portion projecting in a direction opposite to a passenger compartment, and the plugging portion of the skin layer extends to the rib portion.

Still another feature of the present invention is that a method of molding the air bag cover takes a first step in which a pair of molds are clamped and thereafter molten hard resin for a core layer is injected into a cavity of one of the molds and is cooled and hardened to form the core layer, and a second step in which after opening the molds, a core die component (male die) of the one mold is moved and brought into contact with a cavity die component (female die) of the other mold and thereafter molten soft resin for a skin layer is injected into a space between the core layer formed on the core die component and the cavity die component in order to form the skin layer. In the core die component, a slide die is mounted which has a convex portion at an end of the slide die. The convex portion corresponds in size to a hinge hole. In the first step, the slide die is moved forward so that the convex portion is brought into contact with a surface of a cavity die component of the one mold, and thereby a core layer having a hinge hole is formed. In the second step, the slide die is moved backward, and the soft resin of the skin layer flows through the hinge hole of the core layer and onto the back surface of the core layer so that the skin and core layers are formed integrally with each other. The other mold is opened to take out a resultant molding and thereafter the first and second steps are repeated.

DETAILED DESCRIPTION OF THE PREFERRED EMBODIMENTS

Embodiments of the present invention will be described hereinafter with reference to the attached drawings.

FIGS. 1(a) through 4 show a first embodiment of the present invention.

First, the basic construction of the present invention will be described. In FIG. 1(a), reference numeral 20 designates a part of an instrument panel. An air bag cover 21 which covers the upper part of an air bag device (not shown) mounted in the instrument panel 20 has a lid 21a opened by the actuation of the air bag device. The air bag cover 21 consists of a core layer 23 made of hard resin and a skin layer 22 made of soft resin.

The lid 21a in the air bag cover 21 is shaped substantially rectangular. An upper side (upper edge line) of the four sides of the substantially rectangular lid 21a serves as a hinge 24 when the lid 21a is cracked and opened. Along a hinge line 22b, the hinge 24 has hinge grooves 23a formed in the core layer 23 and hinge holes 22a alternately. Each of the other three sides of the rectangular lid 21a is used as a cracked-open portion 26 having a split groove 23f substantially U-shaped from the back surface of the core layer 23 toward the skin layer 22.

At both the corners where the split grooves 23f of the lid 21a and the hinge line 22b intersect, corner hinge holes 25a are formed respectively.

Accordingly, cracking along the split groove 23f which is caused by pressure generated when an air bag is inflated is stopped by the corner hinge hole 25a so as not to be made in a direction other than the extending direction of the split groove 23f. As a result, the lid 21a is cracked along the split grooves 23f and is always opened on the hinge 24. This leads to the qualitatively stable inflation of the air bag and therefore leads to great reliance on the air bag.

FIGS. 1(b) through 1(e) each show the hinge 24 viewed sectionally or perspectively.

As shown in FIG. 1(b) which is a sectional view of the hinge 24 taken on line A—A of FIG. 1(a), the hinge hole 22a is formed in the core layer 23. Through the hinge hole 22a, the soft resin of the skin layer 22 flows onto the back surface of the core layer 23 and, as a result, a plugging portion 22c of the skin layer 22 is formed.

The middle of the plugging portion 22c extending from the skin layer 22 becomes a hinge groove 23b by making the plugging portion 22c concavely thin, so that the lid 21a can be certainly opened on the hinge line 22b.

In FIG. 1(c) which is a sectional view of the hinge 24 taken on line B—B of FIG. 1(a), the core layer 23 of the hinge groove 23a does not have a hole, but the plugging portion 22c having the hinge groove 23b is formed by the soft resin of the skin layer 22 which has flowed to the back surface of the core layer 23 through a nearby hinge hole 22a.

The hinge groove 23a and the hinge hole 22a of the core layer 23 are formed by sliding a slide die 35d forward and backward when molding is carried out, and are alternately formed along the hinge line 22b.

Accordingly, the lid 21a is correctly cracked and opened on the hinge groove 23a, and the plugging portion 22c prevents the lid 21a from scattering in pieces.

FIGS. 1(d) and 1(e) are a sectional view and a rear view of the hinge portion 24, respectively, and show a state in which the soft resin of the skin layer 22 has flowed through the hinge holes 22a and onto the back surface of the core layer 23.

When the lid 21a is favorably opened, the construction of the hinge portion 24 is numerically expressed as follows. That is, the hinge portion 24 is constructed such that the hinge groove 23a (y=30 mm, see FIG. 1(c) and the hinge hole 22a (x=30 mm, z=4 mm, see FIG. 1(b)) are alternately formed along the hinge line 22b in order to make the core layer 23 a thickness of (t) of 0.7 mm. The plugging portion 22c of the skin layer 22 is 34 mm in width (Z) which is formed such that a part of the skin layer 22 formed on the upper surface of the core layer 23 flows through the hinge holes 22a and onto the back surface of the core layer 23.

FIGS. 1(f) and 1(g) each show a split groove 23f formed substantially U-shaped in section. FIG. 1(f) is a sectional view of the split groove 23f of two sides (two edges) of the substantially rectangular lid 21a which are perpendicular to the hinge line 22b of the lid 21a whereas FIG. 1(g) is a sectional view of the split groove 23f of a side (an edge) of the lid 21a which is parallel to the hinge line 22b.

The core layer 23 of the split groove 23f shown in FIG. 1(f) is 0.5 mm in thickness, and the core layer 23 of the split groove 23f shown in FIG. 1(g) has no thickness in order to make the split groove 23f a slit.

As a good result of our experiment, it was confirmed that when the air bag device is actuated to inflate the air bag and apply pressure to the lid 21a constructed according to the above-mentioned measurements, a crack first runs along the split groove 23f whose core layer 23 is formed slit-like and than the crack widens to the 0.5 mm-thick split grooves 23f of the two sides of the rectangular lid 21a perpendicular to the hinge line 22b, and the crack stops at the hinge portion 24. At this time, the hinge portion 24 is bent upward so that the lid 21a is opened on the hinge portion 24.

FIGS. 2(a) and 2(b) are sectional views, each showing a modification of the plugging portion 22c at the hinge portion 24.

In FIG. 2(a), convex portions 23c are formed on the core layer 23 so that the core layer 23 can partly cut into the plugging portion 22c in the vicinity of the outside of the hinge groove 23a.In FIG. 2(b), concave portions 23d are formed in the core layer 23 so that the skin layer 22 can partly cut into the core layer 23 in the vicinity of the outside of the hinge groove 23a.

Owing to the convex and concave portions 23c, 23d, an adhesion area (contact area) is increased between the core layer 23 and the plugging portion 23c and, at the same time, their shapes by which the core layer 23 and the plugging portion 22c are not easily separated from each other enhance the strength of the hinge portion 24, thereby preventing the lid 21a from crashing into pieces and scattering all around.

The action in the above embodiment will now be described.

The air bag device mounted in the instrument panel 20 is actuated first, and then the built-in inflator of the air bag device is actuated to inflate the air bag. The inflated air bag forcibly comes in contact with the back surface of the lid 21a and thrusts the lid 21a up.

By this thrusting force, a crack occurs along the lower edge line (parallel to the hinge line 22b) of the four edge lines of the rectangular lid 21a (see FIG. 1(a)) and, at a dash, the crack widens along both the edge lines (perpendicular to the hinge line 22b) up to the corner hinge holes 25a of the hinge portion 24.

When the crack reaches the hinge portion 24, the hinge portion 24 receives the force of the air bag which is inflating even more and thereby the hinge portion 24 is bent upward at the hinge groove 23a. The lid 21a is opened, and the air bag which has passed through the resultant opening inflates even bigger in the compartment.

At this time, regardless of the physically great change of the lid 21a, the lid 21a can firmly remain there without crashing into pieces and scattering in all directions because the lid 21a has the plugging portion 22c formed by the soft resin of the skin layer 22 which has flowed through the hinge holes 22a.

A method of molding an air bag cover will now be described with reference to FIGS. 3(a) through 4.

Figure 1:
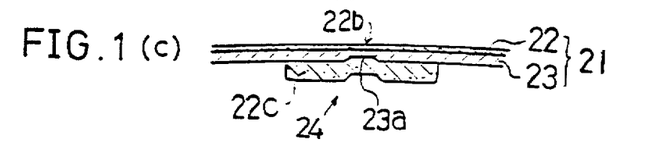
FIG. 1(a) is a partially perspective view showing an automotive air bag cover according to a first embodiment of the present invention.
FIG. 1(b) is a sectional view taken on line A—A if FIG. 1(a)
FIG. 1(c) is a sectional view taken on line B—B of FIG. 1(a)
FIG. 1(d) is a perspective view of a section taken on line C—C of FIG. 1(a)
FIG. 1(e) is a rear view of a hinge portion of FIG. 1(a)
FIG. 1(f) is a sectional view taken on line D—D of FIG. 1(a)
FIG. 1(g) is a sectional view taken on line E—E of FIG. 1(a).
Figure 2:
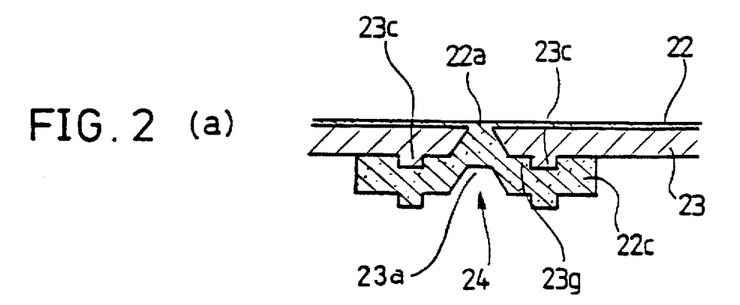
FIGS. 2(a) and 2(b) are each a sectional view showing a modification of FIG. 1(b).
Figure 3A:
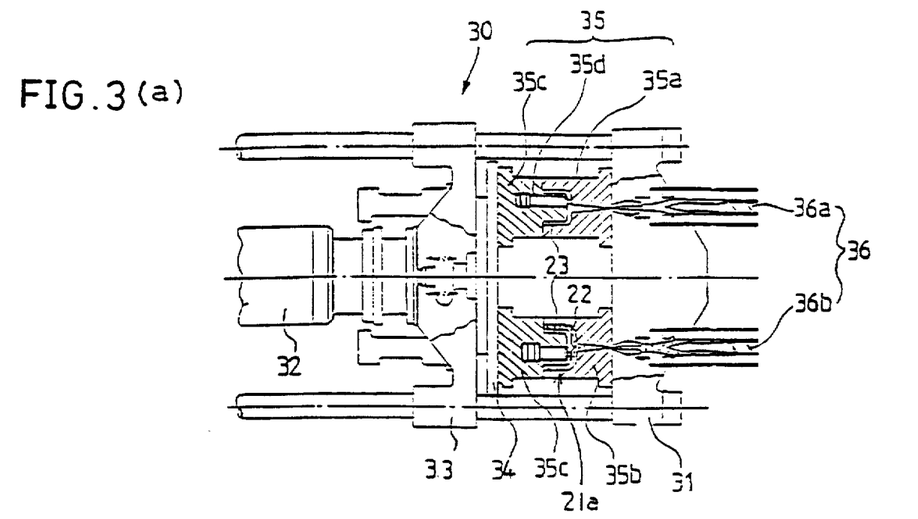
FIG. 3(a) is a descriptive drawing showing a molding method utilizing a two-layer injection molding machine according to the present invention.

The automotive air bag cover 21 can be molded by a two-layer injection molding method utilizing a two-layer injection molding machine 30 showing FIG. 3(a).

As shown in FIG. 3(a), the two-layer injection molding machine 30 has a resin plasticizing mechanism and a mold clamping mechanism. The resin plasticizing mechanism comprises first and second screw cylinder 36a, 36b. The mold clamping mechanism comprises a movable platen 33 having a turning mechanism 34 and a stationary platen 31. In the mold clamping mechanism, clamping for a first molding process is carried out between a pair of a cavity die component (female die) 35a and a core die component (male die) 35c and, simultaneously, clamping for a second molding process is carried out between a pair of a cavity die component (female die) 35b and a core die component (male die) 35c (same as the core die component 35c for the first molding process).

After the respective clampings for the first and second molding processes are simultaneously carried out, hard resin plasticized in the first screw cylinder 36a is injected into the mold of the pair of the cavity and core die components 35a and 35c so as to form a core layer 23. On the other hand, soft resin plasticized in the second screw cylinder 36b is injected into the mold of the other pair of the cavity and core die components 35b and 35c (to this die component 35c, a core layer of the hard resin has already adhered) so as to form a skin layer 22 integral with the core layer 23.

After that, the movable platen 33 is slid to release the clamping of the mold and take out a resultant molding (i.e., an air bag cover) from the mold for the second process, and then the turning mechanism 34 to which the core die components 35c, 35c are fastened is turned for clamping. To manufacture another air bag cover, the first and second molding processes are repeated in this way.

Figure 3B:
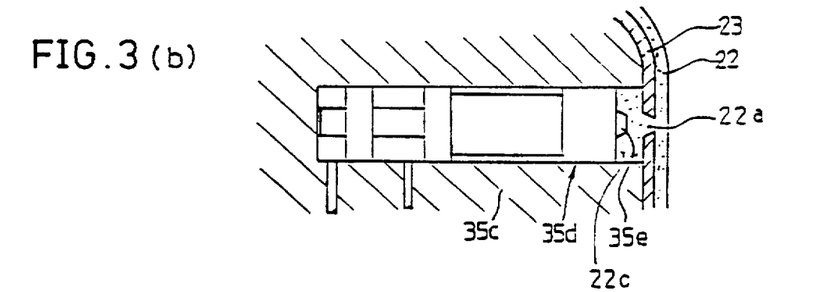
FIG. 3(b) is an enlarged sectional view of a slide core of FIG. 3(a)

FIG. 3(b) is a sectional view of a slide 35d with a plunger fitted in the core die component 35c. The slide die 35d is used to form a hinge hole 22a in a core layer 23 by moving forward and backward during injection molding.

In detail, in the first molding process extrusion pressure is applied to the plunger. Hard resin of the core layer 23 is injected in a state in which a convex portion 35e formed on the slide die 35d is in contact with the cavity die component 35a so as to form the hinge hole 22a in the core layer 23.

Subsequently, in the second molding process, return pressure is applied to the plunger, and thereby the plunger is returned to a predetermined position (shown in FIG. 3(b)) in order to form a plugging portion 22c of a skin layer 22 on the back surface of the core layer. Molten soft resin is then injected, and part of the soft resin of the skin layer 22 which has flowed through the hinge hole 22a forms the plugging portion 22c on the back surface of the core layer 23.

By merely disposing such a slide die 35d having a forward-backward sliding mechanism in the core die component 35c, it becomes possible to form the soft-resin-made plugging portion 22c formed on the back surface of the core layer 23 into various shapes, such as a plane shape, a concave shape, a convex shape, a shape of a plurality of rows of hinge holes 22a, a shape of a series of holes 23e, and so on. Accordingly, variously shaped hinge portions 24 each of which has a useful function can be easily formed. This leads to a reduction of manufacturing costs of a metallic mold (die) and a reduction of the number of molding processes.

Figure 3C:
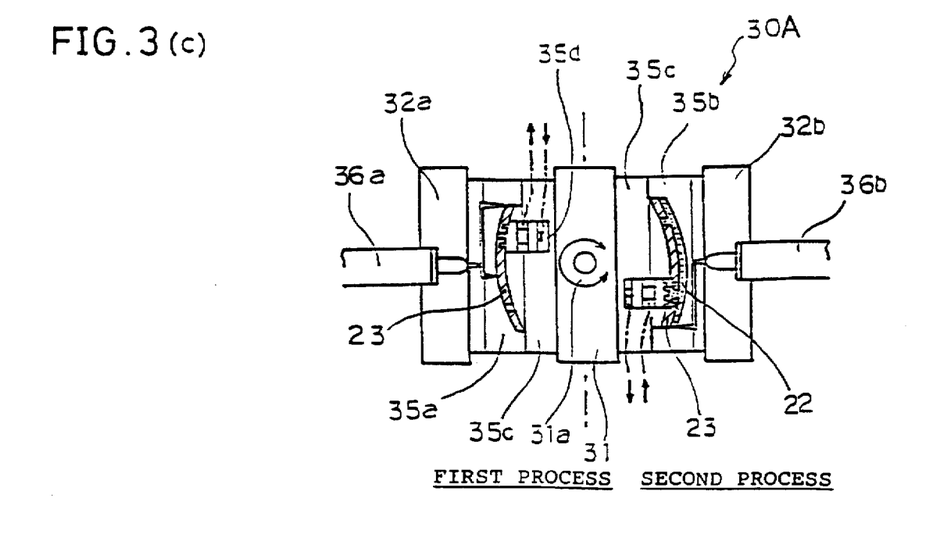
FIG. 3(c) is a descriptive drawing showing a molding method utilizing another type of two-layer injection molding machine different from that of FIG. 3(a).

FIG. 3(c) shows another type of two-layer injection molding machine 30A. This machine 30A is different from the two-layer injection molding machine 30 of FIG. 3(a) in the following. As shown in FIG. 3(c), a stationary platen 31 to each side of which a core die component 35c is fastened is mounted in the middle of the two-layer injection molding machine 30A. A turning mechanism 31a is mounted in the stationary platen 31. When the first molding process in which a core layer 23 is molded is completed, the core die component 35c is turned by 180° to a predetermined position for the second molding process in order to combine the core die component 35c with a corresponding cavity die component 35b. Thereby, a skin layer 22 is formed integrally with the core layer 23.

The two-layer injection molding machine 30A adopts a system in which the core die components 35c, 35c fastened to the sides of the stationary platen 31 receive the corresponding cavity die components 35a, 35b from two directions (from right and left). Therefore, a power plant can be made small-sized. In addition, since a wide space can be taken between the stationary and movable platens 31 and 32a and between the stationary and movable platens 31 and 32b, the two-layer injection molding machine 30A is suitable for manufacturing a large-sized molding.

Figure 4:
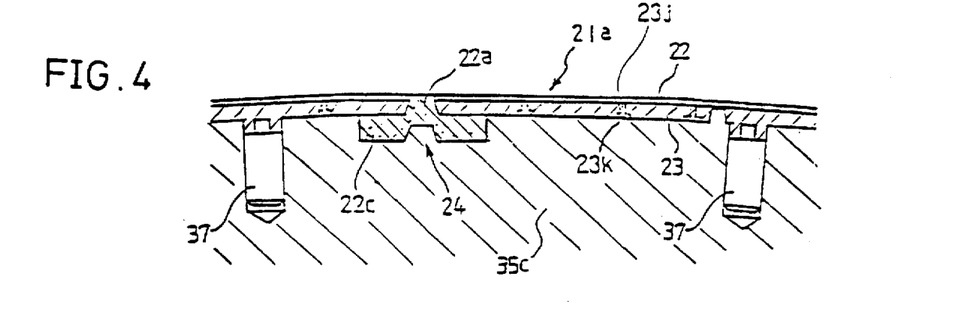
FIG. 4 is a descriptive drawing showing another method of molding a lid according the present invention.

FIG. 4 is a descriptive drawing of a method of molding a two-layer air bag cover by utilizing a conventional injection molding machine (not shown). According to this molding method, a core layer 23 formed individually by an injection molding machine (not shown) is set in a core die component 35c mounted in an injection molding machine shown in FIG. 4, and thereafter a skin layer 22 is injected onto the upper surface of the core layer 23 so as to mold a two-layer air bag cover.

As shown in FIG. 4, nest pins 37 are mounted in the core die component 35c for setting the core layer 23 on the core die component 35c. The core pin 37 serves to position the core layer 23 on the core die component 35c and prevent the core layer 23 from being displaced because of the pressure of resin during molding. FIG. 4 shows a sectional view of the core die component 35c on which the core layer 23 is set.

Small through-holes 23j and stepped hollows 23k contiguous to the through-holes 23j may be formed in the core layer 23 for enhancing the combining force between the skin and core layers 22, 23 by pouring the soft layer 22 into the through-holes 23j and the stepped hollows 23k.

According to this molding method, there is an advantage in that molding can be carried out without a two-layer injection molding dedicated machine. In addition, since the turning of the mold is not required although a certain number of molding processes are required, this method is suitable for forming a large-sized molding for non-mass production.

Both of the above-mentioned methods can produce an air bag cover same in construction and function.

By the way, the hard resin mentioned in this embodiment is mainly a polypropylene composite resin material, and the soft resin is mainly a thermoplastic elastomer, in particular, a styrene elastomer resin material of fine-quality and good-feel.

Figure 5A:
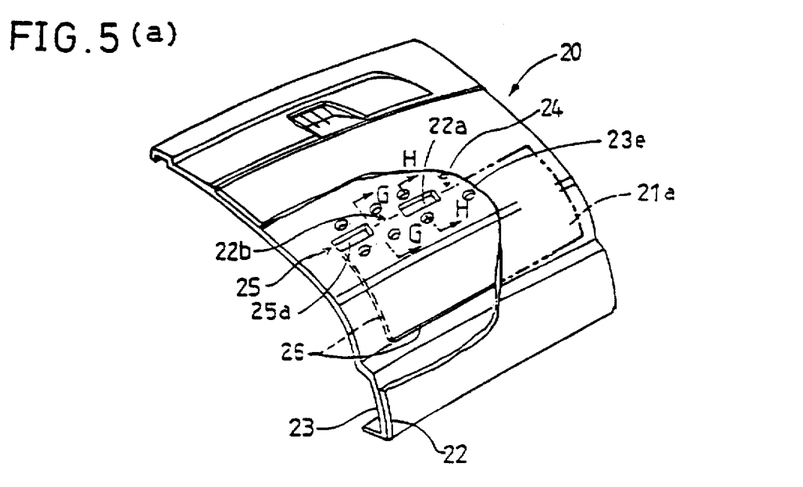
FIG. 5(a) is a partially perspective view showing an automotive air bag cover according to a second embodiment of the present invention.
Figure 5B:
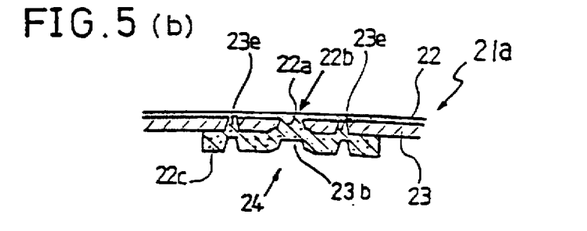
FIG. 5(b) is a sectional view taken on line H—H of FIG. 5(a)
Figure 5C:
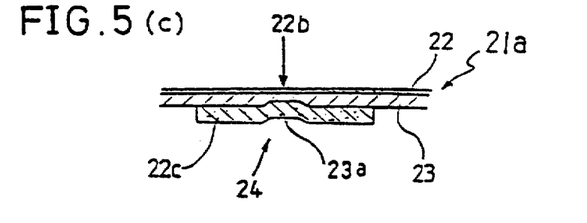
FIG. 5(c) is a sectional view taken on line G—G of FIG. 5(a).

FIGS. 5(a), and 5(c) show a second embodiment of the present invention.

First, the basic construction will be described.

In FIG. 5(a), reference number 20 designates a part of an instrument panel. An air bag cover 21 which covers the upper part of an air bag device (not shown) mounted in the instrument panel 20 has a lid 21a opened by the actuation of the air bag device. The air bag cover 21 consists of a core layer 23 made of hard resin and a skin layer 22 made of soft resin.

The lid 21a in the air bag cover 21 is shaped substantially rectangular. An upper side (upper edge line) of the four sides of the substantially rectangular lid 21a serves as a hinge 24 when the lid 21a is cracked and opened. Along a hinge line 22b, the hinge 24 has hinge grooves 23a formed in the core layer 23 and hinge holes 22a alternately. This construction of the air bag cover 21 is the same as that of FIG. 1(a).

The air bag cover 21 of the second embodiment is different from that the of first embodiment in that, in the vicinity of hinge grooves 23a and hinge holes 22a of the core layer 23 which are formed along a hinge line 22b, the core layer 23 has rows of connecting holes 23e bored through the core layer 23 at regular intervals parallel to the hinge line 22b.

FIG. 5(b) is a sectional view taken on line H—H of FIG. 5(a), and FIG. 5(c) is a sectional view taken on line G—G of FIG. 5(a).

As shown in FIG. 5(b), on the back surface of the core layer 23 along the hinge line 22b, a part of soft resin of the skin layer 22 which as flowed through the hinge holes 22a is connected to a part of soft resin of the skin layer 22 which has flowed through the connecting holes 23e. As a result, an integral plugging-portion 22c of the skin layer 22 is formed on the back surface of the core layer 23.

FIG. 5(c) shows a state in which the back surface of a part of the core layer 23 having no hinge holes 22a or connecting holes 23e also receives a part of the skin layer 22 which has flowed through nearby hinge holes 22a or connecting holes 23e and, as a result, the hinge 24 having an integral plugging-portion 22c of the skin layer 22 is formed.

As mentioned above, the hinge 24 reaches a state in which the core layer 23 is sandwiched between two skin layers 22 and therefore the intensity of the hinge 24 in enhanced. Accordingly, even when the hinge 24 is bent by pressure generated when the air bag is inflated, the skin layer 22 is not separated from the core layer 23, and the lid 21a is correctly opened on the hinge line 22b so that the air bag can be perfectly inflated.

Since other constructions, operations, and molding methods in this embodiment are the same as those in the first embodiment, a description of them will be omitted.

Figure 6:
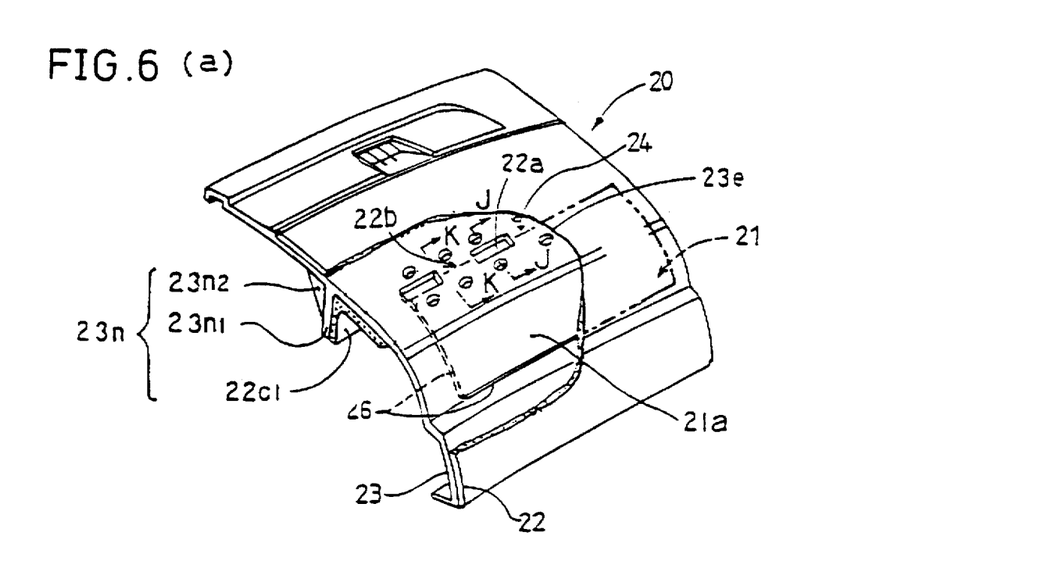
FIG. 6(a) is a partially perspective view showing an automotive air bag cover according to a third embodiment of the present invention.
FIG. 6(b) is a sectional view taken on line J—J of FIG. 6(a)
FIG. 6(c) is a sectional view taken on line K—K of FIG. 6(a).

FIGS. 6(a), 6(b), and 6(c) show a third embodiment of the present invention.

First, a constructional difference between this embodiment and the second embodiment will be described.

The air bag cover 21 of the third embodiment is different from that of the second embodiment in that, as shown in FIG. 6(a), a rib 23n is erected on the back surface of the core layer 23 of the air bag cover 21 in the vicinity of and parallel to the hinge 24.

The rib 23n consists of a rib 23n1 which projects almost perpendicularly to the core layer 23 and a plurality of stiffening ribs 23n2 each of which is in contact with a surface of the rib 23n1 and has substantially triangular shape in section. The soft resin of the skin layer 22 flows through the hinge hole 22a and onto the back surface of the core layer 23. The soft resin which has flowed therethrough forms a plugging portion 22c1 covering not only the back surface of the core layer 23 but also the other surface of the rib 23n1 as shown in FIG. 6(b). A fastening hole 23n3 is bored through the rib 23n1 covered by the plugging portion 22c1 in order to fasten the rib 23n to a vehicle body via, for example, a bracket which is a vehicle body supporting member.

By constructing the air bag cover 21 as above, when the air bag is inflated, the lid 21a is cracked along the split grooves 23f up to the hinge 24 by the pressure of the air bag, and the hinge 24 is bent upward, and thereby the lid 21a is opened.

Since the skin layer 22 extends to the rib 23n, force for holding the lid 21a is enhanced according to the increase of a bonding area between the skin and core layers 22, 23. Further, since the rib 23n is fastened to the vehicle body, the hinge 24 does not move when the air bag is inflated, and therefore the lid 21a can be correctly opened on the hinge 24.

Accordingly, because of the strong holding force of the hinge 24, the lid 24a can remain there without breaking into pieces and scattering around when the intense pressure of the air bag is applied to the lid 21a.

Since other constructions, operations, and molding methods in this embodiment are the same as those in the second embodiment, a description of them will be omitted.

What is claimed is:

1. An automotive air bag cover covering an air bag device disposed in front of an assistant driver's seat and inside an instrument panel, said instrument panel consisting of a core layer made of hard resin and a skin layer made of soft resin, said skin layer being superimposed upon said core layer, said air bag cover having a lid to be opened by actuation of said air bag device, said air bag cover and said lid being formed integrally with said instrument panel, wherein:

said lid is formed by a split groove and a hinge groove in said core layer of said instrument panel; and hinge holes are bored through said core layer along said hinge groove, and through said hinge holes a part of said skin layer of said instrument panel is extended to a back surface of said core layer so as to form a plugging portion made of the soft resin.

2. An automotive air bag cover according to claim 1, wherein said core layer is sandwiched between said skin layer and said plugging portion, and said plugging portion is engage with an engagement portion formed on the back surface of said core layer around said hinge holes.

3. An automotive air bag cover according to claim 1, wherein on at least one side of said hinge groove, a plurality of connecting holes are bored through said core layer parallel to said hinge groove, and a part of said skin layer is extended through said connecting holes to the back surface of said core layer and is connected to said plugging portion.

4. An automotive air bag cover according to claim 1, wherein a hinge hole is formed at each corner at which said split groove and said hinge groove intersect.

5. An automotive air bag according to claim 1, wherein said core layer forms a back of said air bag cover and has a rib portion projecting out of the back thereof, said rib portion being in the vicinity of and parallel to said hinge portion and fixed to a member of a body of a vehicle, and said plugging portion is extended to said rib portion.

6. A method of molding an automotive air bag cover covering an air bag device disposed in front of an assistant driver's seat and inside an instrument panel, said instrument panel consisting of a core layer made of hard resin and a skin layer made of soft resin, said skin layer being superimposed upon said core layer, said air bag cover having a lid to be cracked and opened by actuation of said air bag device, said air bag cover and said lid being formed integrally with said instrument panel, said method comprising:

a first step of injecting molten hard resin between a cavity die component and a core die component and thereafter cooling and hardening said molten hard resin so that said core layer is molded to have a split groove and a hinge groove; and a second step of moving said core die component and, with said core die component and another cavity die component clamped, injecting molten soft resin between said core die component and said another cavity die component and thereafter cooling and hardening said molten soft resin so as to form said skin layer on said core layer;

said core die component having a slide die, said slide die having a plurality of convex portions projecting from a surface of an end thereof;

wherein in said first step, said slide die is moved forward to bore a plurality of hinge holes through said core layer along said hinge groove by means of said plurality of convex portions, and, in said second step, said slide die is moved backward and thereafter said molten soft resin is extended through said plurality of hinge holes to a back surface of said core layer and said plurality of convex portions form a plugging portion integral with said skin layer.

7. An automotive air bag cover according to claim 6, wherein said hinge holes each become progressively bigger in diameter toward the back surface of said core layer.

8. A method according to claim 6, wherein said convex portions are each tapered.

* * * * *